United States Patent
John Wilson et al.

(10) Patent No.: US 10,849,050 B2
(45) Date of Patent: Nov. 24, 2020

(54) METHODS AND APPARATUSES FOR RATE MATCHING

(71) Applicant: QUALCOMM Incorporated, San Diego, CA (US)

(72) Inventors: Makesh Pravin John Wilson, San Diego, CA (US); Tao Luo, San Diego, CA (US); Bilal Sadiq, Basking Ridge, NJ (US); Sony Akkarakaran, Poway, CA (US); Hung Dinh Ly, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/275,063

(22) Filed: Feb. 13, 2019

(65) Prior Publication Data

US 2019/0261252 A1    Aug. 22, 2019

Related U.S. Application Data

(60) Provisional application No. 62/710,303, filed on Feb. 16, 2018.

(51) Int. Cl.
*H04W 48/10* (2009.01)
*H04W 56/00* (2009.01)
(Continued)

(52) U.S. Cl.
CPC .......... *H04W 48/10* (2013.01); *H04L 1/0053* (2013.01); *H04L 1/0067* (2013.01); *H04W 48/08* (2013.01);
(Continued)

(58) Field of Classification Search
CPC ... H04W 48/08; H04W 48/10; H04W 56/001; H04W 72/005; H04W 72/0446; H04L 1/0013; H04L 1/0053; H04L 1/0067
See application file for complete search history.

(56) References Cited

U.S. PATENT DOCUMENTS 10,505,773 B2 * 12/2019 Sadiq .................... H04L 5/0048
10,567,058 B2 *  2/2020 Guo ..................... H04B 7/0626
(Continued)

OTHER PUBLICATIONS

Interdigital Inc: "On Remaining Issues of Synchronization Signal", 3GPP Draft; R1-1718472, 3rd Generation Partnership Project (3GPP), Mobile Competence Centre; 650, Route Des Lucioles; F-06921 Sophia-Antipolis Cedex; France, vol. RAN WG1, No. Prague, Czech Republic; 20171009-20171013, Oct. 8, 2017, XP051341654, Retrieved from the Internet: URL:http://www.3gpp.org/ftp/Meetings_ 3GPP_SYNC/RAN1/Docs/ [retrieved on Oct. 8, 2017], 5 pages, p. 2-p. 4, Figure 1.

(Continued)

*Primary Examiner* — Kevin D Mew
(74) *Attorney, Agent, or Firm* — Qualcomm Incorporated

(57) ABSTRACT

An aspect of the present disclosure includes methods, systems, and computer-readable media for receiving, from a base station within a cell, a remaining minimum system information message occupying M×N resource blocks, wherein the remaining minimum system information message includes remaining minimum system information and a synchronization signal block, identifying boundaries of the synchronization signal block, the synchronization signal block occupying K×L resource blocks, wherein K<M and L<N, extracting initialization information from the remaining minimum system information, wherein the remaining minimum system information occupies (M×N)−(K×L) resources blocks outside of the K×L resource blocks of the
(Continued)

synchronization signal block, and connecting to the base station using the initialization information.

30 Claims, 10 Drawing Sheets

(51) Int. Cl.
    *H04W 72/00*     (2009.01)
    *H04W 72/04*     (2009.01)
    *H04W 48/08*     (2009.01)
    *H04L 1/00*     (2006.01)

(52) U.S. Cl.
    CPC ....... *H04W 56/001* (2013.01); *H04W 72/005* (2013.01); *H04W 72/0446* (2013.01); *H04L 1/0013* (2013.01)

(56) References Cited

U.S. PATENT DOCUMENTS

| | | | |
|---|---|---|---|
| 2017/0353254 A1* | 12/2017 | Islam | H01Q 3/2605 |
| 2017/0353255 A1* | 12/2017 | Islam | H04J 1/065 |
| 2017/0353256 A1* | 12/2017 | Islam | H01Q 3/2605 |
| 2017/0353257 A1* | 12/2017 | Islam | H04J 3/0617 |
| 2018/0198575 A1* | 7/2018 | Sheng | H04J 11/0069 |
| 2018/0254796 A1* | 9/2018 | Akkarakaran | H04B 7/208 |
| 2018/0324678 A1* | 11/2018 | Chen | H04W 8/08 |
| 2018/0376454 A1* | 12/2018 | strom | H04L 5/0053 |
| 2019/0037509 A1* | 1/2019 | Li | H04L 27/0006 |
| 2019/0124609 A1* | 4/2019 | Gheorghiu | H04W 56/00 |
| 2019/0159226 A1* | 5/2019 | Ly | H04L 5/0053 |
| 2020/0092875 A1* | 3/2020 | Takeda | H04W 72/04 |

OTHER PUBLICATIONS

International Search Report and Written Opinion—PCT/US2019/018062—ISA/EPO—dated Apr. 30, 2019.
Samsung: "Remaining Details on RMSI", 3GPP Draft; R1-1720274-RMSI Delivery, 3rd Generation Partnership Project (3GPP), Mobile Competence Centre ; 650, Route Des Lucioles ; F-06921 Sophia-Antipolis Cedex ; France, vol. RAN WG1, No. Reno, USA; 20171127-20171201, Nov. 18, 2017 (Nov. 18, 2017), XP051369903, 19 Pages, Retrieved from the Internet: URL:http://www.3gpp.org/ftp/tsg%5Fran/WG1%5FRL1/TSGR1%5F91/Docs/ [retrieved on Nov. 18, 2017], p. 5-p. 18, Figures 1-8, Tables 1-15.
Qualcomm Incorporated: "Remaining System Information Delivery Consideration", 3GPP Draft; R1-1802811 Remaining System Information Delivery Consideration, 3rd Generation Partnership Project (3GPP), Mobile Competence Centre ; 650, Route Des Lucioles ; F-06921 Sophia-Antipolis CEO, vol. RAN WG1, No. Athens, Greece; 20180226-20180302, Feb. 17, 2018 (Feb. 17, 2018), XP051398223, 5 Pages, Retrieved from the Internet: URL: http://www.3gpp.org/ftp/tsg%5Fran/WG1%5FRL1/TSGR1%5F92/Docs/ [retrieved on Feb. 17, 2018].
Samsung: "Remaining Details on SS Burst Set Related Procedures", 3GPP Draft; R1-1715908-SS_Block_V2, 3rd Generation Partnership Project (3GPP), Mobile Competence Centre ; 650, Route Des Lucioles ; F-06921 Sophia-Antipolis Cedex ; France, vol. RAN WG1, No. Nagoya, Japan; 20170918-20170921, Sep. 17, 2017 (Sep. 17, 2017), XP051339367, 9 Pages, Retrieved from the Internet: URL:http://www.3gpp.org/ftp/Meetings_3GPP_SYNC/RAN1/Docs/ [retrieved on Sep. 17, 2017], Section 2.2; p. 3-p. 5.

* cited by examiner

| K0 Values Half-Frame Duration and Slot Offset | Start and Length of PDSCH Symbol | SSB Bitmap | Entire Symbol vs Only SSB |
|---|---|---|---|
| 2 bit | 3 bits | 2 bits | 1 bit |

METHODS AND APPARATUSES FOR RATE MATCHING

CROSS REFERENCE TO RELATED APPLICATIONS

The present application claims priority to U.S. Provisional Application No. 62/710,303, filed on Feb. 16, 2018, entitled "PDSCH and SSB Rate Matching Behavior", the content of which is incorporated by reference in its entirety.

BACKGROUND

Aspects of the present disclosure relate generally to wireless communication networks, and more particularly, to efficient use of network resources during initialization of a user equipment (UE).

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

After a UE turns on or restarts, the UE relies on initialization information sent by a base station (BS) within a cell to join the network. As the BS broadcasts initialization information and transmits remaining minimum system information (RMSI), synchronization signal (SS) blocks may also be sent. Given the amount of data that needs to be sent from the BS to the UE, it may be desirable to efficiently utilize the network resources during the initialization process.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure includes methods for receiving, from a base station within a cell, a remaining minimum system information message occupying M×N resource blocks, wherein the remaining minimum system information message includes remaining minimum system information and a synchronization signal block, identifying boundaries of the synchronization signal block, the synchronization signal block occupying K×L resource blocks, wherein K<M and L<N, extracting initialization information from the remaining minimum system information, wherein the remaining minimum system information occupies (M×N)−(K×L) resources blocks outside of the K×L resource blocks of the synchronization signal block, and connecting to the base station using the initialization information, wherein M indicates a resource block length of the remaining minimum system information message, N indicates a slot length of the remaining minimum system information message, K indicates a resource block length of the synchronization signal block, and L indicates a slot length of the synchronization signal block.

Another aspect of the present disclosure includes a user equipment having a memory, a transceiver, and one or more processors configured to perform the steps of receiving, from a base station within a cell, a remaining minimum system information message occupying M×N resource blocks, wherein the remaining minimum system information message includes remaining minimum system information and a synchronization signal block, identifying boundaries of the synchronization signal block, the synchronization signal block occupying K×L resource blocks, wherein K<M and L<N, extracting initialization information from the remaining minimum system information, wherein the remaining minimum system information occupies (M×N)−(K×L) resources blocks outside of the K×L resource blocks of the synchronization signal block, and connecting to the base station using the initialization information, wherein M indicates a resource block length of the remaining minimum system information message, N indicates a slot length of the remaining minimum system information message, K indicates a resource block length of the synchronization signal block, and L indicates a slot length of the synchronization signal block.

Some aspects of the present disclosure include a non-transitory computer readable medium having instructions that, when executed by one or more processors of a user equipment, cause the one or more processors to perform the steps of receiving, from a base station within a cell, a remaining minimum system information message occupying M×N resource blocks, wherein the remaining minimum system information message includes remaining minimum system information and a synchronization signal block, identifying boundaries of the synchronization signal block, the synchronization signal block occupying K×L resource blocks, wherein K<M and L<N, extracting initialization information from the remaining minimum system information, wherein the remaining minimum system information occupies (M×N)−(K×L) resources blocks outside of the K×L resource blocks of the synchronization signal block, and connecting to the base station using the initialization information, wherein M indicates a resource block length of the remaining minimum system information message, N indicates a slot length of the remaining minimum system information message, K indicates a resource block length of the synchronization signal block, and L indicates a slot length of the synchronization signal block.

Certain aspects of the present disclosure includes an apparatus having means for receiving, from a base station within a cell, a remaining minimum system information message occupying M×N resource blocks, wherein the remaining minimum system information message includes remaining minimum system information and a synchronization signal block, means for identifying boundaries of the synchronization signal block, the synchronization signal block occupying K×L resource blocks, wherein K<M and L<N, means for extracting initialization information from the remaining minimum system information, wherein the remaining minimum system information occupies (M×N)–(K×L) resources blocks outside of the K×L resource blocks of the synchronization signal block, and means for connecting to the base station using the initialization information, wherein M indicates a resource block length of the remaining minimum system information message, N indicates a slot length of the remaining minimum system information message, K indicates a resource block length of the synchronization signal block, and L indicates a slot length of the synchronization signal block.

An aspect of the present disclosure includes methods for receiving, from a base station within a cell, a remaining minimum system information message occupying a set of resource blocks, wherein the remaining minimum system information message includes remaining minimum system information and a synchronization signal block, identifying boundaries of the synchronization signal block, the synchronization signal block occupying a first subset of the set of resource blocks, extracting initialization information from the remaining minimum system information, wherein the remaining minimum system information occupies a second subset of the set of resources blocks outside of the first subset of the set of resource blocks, and connecting to the base station using the initialization information.

Another aspect of the present disclosure includes a user equipment having a memory, a transceiver, and one or more processors configured to perform the steps of receiving, from a base station within a cell, a remaining minimum system information message occupying a set of resource blocks, wherein the remaining minimum system information message includes remaining minimum system information and a synchronization signal block, identifying boundaries of the synchronization signal block, the synchronization signal block occupying a first subset of the set of resource blocks, extracting initialization information from the remaining minimum system information, wherein the remaining minimum system information occupies a second subset of the set of resources blocks outside of the first subset of the set of resource blocks, and connecting to the base station using the initialization information.

Some aspects of the present disclosure include a non-transitory computer readable medium having instructions that, when executed by one or more processors of a user equipment, cause the one or more processors to perform the steps of receiving, from a base station within a cell, a remaining minimum system information message occupying a set of resource blocks, wherein the remaining minimum system information message includes remaining minimum system information and a synchronization signal block, identifying boundaries of the synchronization signal block, the synchronization signal block occupying a first subset of the set of resource blocks, extracting initialization information from the remaining minimum system information, wherein the remaining minimum system information occupies a second subset of the set of resources blocks outside of the first subset of the set of resource blocks, and connecting to the base station using the initialization information.

Certain aspects of the present disclosure includes an apparatus having means for means for receiving, from a base station within a cell, a remaining minimum system information message occupying a set of resource blocks, wherein the remaining minimum system information message includes remaining minimum system information and a synchronization signal block, means for identifying boundaries of the synchronization signal block, the synchronization signal block occupying a first subset of the set of resource blocks, means for extracting initialization information from the remaining minimum system information, wherein the remaining minimum system information occupies a second subset of the set of resources blocks outside of the first subset of the set of resource blocks, and means for connecting to the base station using the initialization information.

An aspect of the present disclosure includes methods for encoding a remaining minimum system information message occupying a set of resource blocks, wherein the remaining minimum system information message includes a synchronization signal block occupying a first subset of the set of resource blocks and remaining minimum system information occupying a second subset of the set of resource blocks outside the first subset of the set of resource blocks and transmitting the remaining minimum system information message.

Another aspect of the present disclosure includes a base station having a memory, a transceiver, and one or more processors configured to perform the steps of encoding a remaining minimum system information message occupying a set of resource blocks, wherein the remaining minimum system information message includes a synchronization signal block occupying a first subset of the set of resource blocks and remaining minimum system information occupying a second subset of the set of resource blocks outside the first subset of the set of resource blocks and transmitting the remaining minimum system information message.

Some aspects of the present disclosure include a non-transitory computer readable medium having instructions that, when executed by one or more processors of a base station, cause the one or more processors to perform the steps of encoding a remaining minimum system information message occupying a set of resource blocks, wherein the remaining minimum system information message includes a synchronization signal block occupying a first subset of the set of resource blocks and remaining minimum system information occupying a second subset of the set of resource blocks outside the first subset of the set of resource blocks and transmitting the remaining minimum system information message.

Certain aspects of the present disclosure includes an apparatus having means for means for encoding a remaining minimum system information message occupying a set of resource blocks, wherein the remaining minimum system information message includes a synchronization signal block occupying a first subset of the set of resource blocks and remaining minimum system information occupying a second subset of the set of resource blocks outside the first subset of the set of resource blocks and means for transmitting the remaining minimum system information message.

An aspect of the present disclosure includes a method for receiving, from a BS within the cell, a first set of resources for a synchronization signal block, receiving, from the BS within the cell, a grant that indicates a second source of resources allocated for system information, wherein the second set of resources is rate matched around the first set of resources, extracting initialization information from the system information, and connecting to the base station using the initialization information.

Another aspect of the present disclosure includes a base station having a memory, a transceiver, and one or more processors configured to perform the steps of receiving, from a BS within the cell, a first set of resources for a synchronization signal block, receiving, from the BS within the cell, a grant that indicates a second source of resources allocated for system information, wherein the second set of resources is rate matched around the first set of resources, extracting initialization information from the system information, and connecting to the base station using the initialization information.

Some aspects of the present disclosure include a non-transitory computer readable medium having instructions that, when executed by one or more processors of a base station, cause the one or more processors to perform the steps of receiving, from a BS within the cell, a first set of resources for a synchronization signal block, receiving, from the BS within the cell, a grant that indicates a second source of resources allocated for system information, wherein the second set of resources is rate matched around the first set of resources, extracting initialization information from the system information, and connecting to the base station using the initialization information.

Certain aspects of the present disclosure includes an apparatus having means for receiving, from a BS within the cell, a first set of resources for a synchronization signal block, means for receiving, from the BS within the cell, a grant that indicates a second source of resources allocated for system information, wherein the second set of resources is rate matched around the first set of resources, means for extracting initialization information from the system information, and means for connecting to the base station using the initialization information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 4 is an example of a table of fields used by the UE to implement rate matching around a synchronization block;

DETAILED DESCRIPTION

Figure 1:
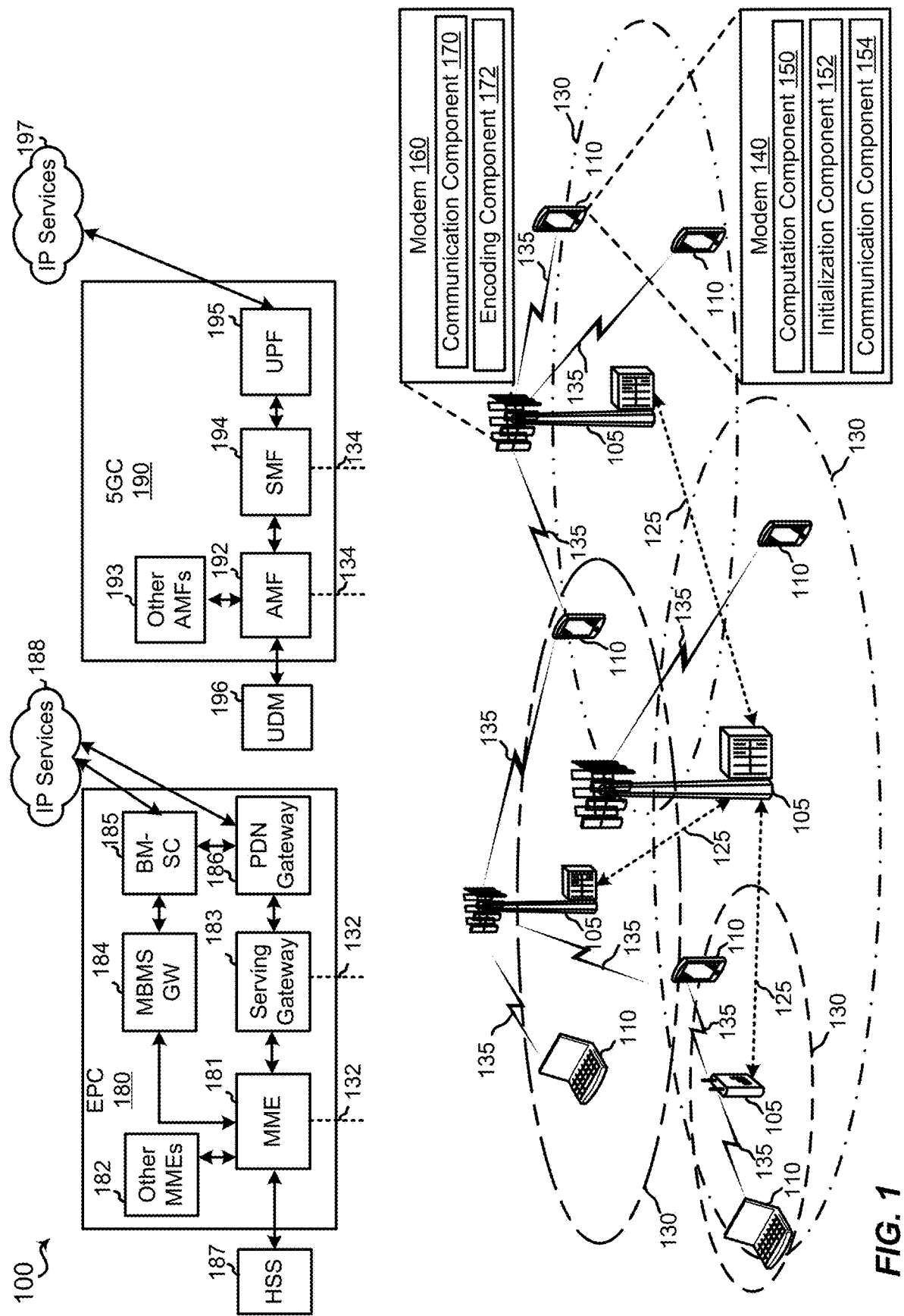
FIG. 1 is a schematic diagram of an example of a wireless communication network including at least one user equipment.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium, such as a computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Rate matching of physical down-link shared channel (PDSCH) around existing resources such as synchronization signal blocks (SSBs) and/or control resource sets (CORESETs) may improve the efficiency of resource usage. If a UE detects a SSB, monitors the associated CORESET, and receives a grant that overlaps with the SSB, the UE may rate match around the detected SSB associated with the RMSI PDSCH to improve the efficiency of resource usage. When receiving the PDSCH conveying system information blocks, the UE may assume that no synchronization signal (SS) and/or physical broadcast channel (PBCH) block, except the SS/PBCH block associated with the physical down-link control channel (PDCCH) scheduling the PDSCH is transmitted in the resource elements (REs) used by the UE for the reception of the PDSCH. Additionally, when there are two SS/PBCH blocks in one slot (e.g. when PDSCH is having a different numerology than SS/PBCH block), the UE may be specified to rate match the PDSCH around all the SSBs in the slot if the PDSCH indicated by the PDCCH is associated with one of the SSBs in the slot. Bits in certain fields, such as the transmit power control (TPC) command, physical up-link control channel resource indicator, and/or PDSCH-to-hybrid automatic repeat request (HARD) feedback timing indicator may be repurposed for the implementations of rate matching. The UE determines the offset in slots between the DL RMSI PDCCH and the RMSI PDSCH from the K0 value (shown in FIG. 4), and the start symbol and length of the PDSCH from, for example, the second column in the table. The UE also determines the SSBs that do not contain PDSCH within a slot from the SSB Bitmap, and further determines that the REs frequency-division multiplexed with the SSBs indicated by the SSB bitmap do not transmit PDSCH. And a few of the bits such as TPC command (2 bits), PUCCH resource indicator (2 bits) or PDSCH-to-HARQ feedback timing indicator (3 bits) may be repurposed for the start and length indicator value (SLIV) when monitored via the system information radio network temporary identifier (SI-RNTI).

Referring to FIG. 1, in accordance with various aspects of the present disclosure, a wireless communication network 100 includes at least one UE 110 including a modem 140 with a computation component 150. The computation component 150 may be configured to identify boundaries of a synchronization block within a RMSI message. For example, the computation component 150 may identify the resource block indices and slot indices of a synchronization block to identify the boundaries. The modem 140 may further include an initialization component 152. The initialization component 152 utilizes initialization information transmitted by a BS 105 to initialize a wireless communication link 135 with the BS 105. The modem 140 may include a communication component 154 configured to communicate with the BS 105, such as receiving initialization information and sending a request to join the network.

In some implementations, a modem 160 of the BS 105 includes a communication component 170. The communication component 170 may transmit initialization information to the UEs 110. The modem 160 may include an encoding component 172. The encoding component 172 may encode initialization information, synchronization information, and other relevant information into a RMSI message to be transmitted to one or more UEs 110.

The modem 160 of a base station 105 may be configured to communicate with other base stations 105 and UEs 110 via a cellular network, a Wi-Fi network, or other wireless and wired networks. The modem 140 of a UE 110 may be configured to communicate with the base stations 105 via a cellular network, a Wi-Fi network, or other wireless and wired networks. The modems 140, 160 may receive and transmit data packets.

The wireless communication network 100 may include one or more base stations 105, one or more UEs 110, and a core network, such as an Evolved Packet Core (EPC) 180 and/or a 5G core (5GC) 190. The EPC 180 and/or the 5GC 190 may provide user authentication, access authorization, tracking, internet protocol (IP) connectivity, and other access, routing, or mobility functions. The base stations 105 configured for 4G LTE (collectively referred to as Evolved Universal Mobile Telecommunications System (UMTS) Terrestrial Radio Access Network (E-UTRAN)) may interface with the EPC 180 through backhaul links 132 (e.g., S1, etc.). The base stations 105 configured for 5G NR (collectively referred to as Next Generation RAN (NG-RAN)) may interface with the 5GC 190 through backhaul links 134. In addition to other functions, the base stations 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 105 may communicate with each other directly or indirectly (e.g., through EPC 180 or the 5GC 190), with one another over backhaul links 125, 132, or 134 (e.g., Xn or X1 interfaces). The backhaul links 125, 132, 134 may be wired or wireless communication links.

The base stations 105 may wirelessly communicate with the UEs 110 via one or more base station antennas. Each of the base stations 105 may provide communication coverage for a respective geographic coverage area 130. In some examples, the base stations 105 may be referred to as a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for the EPC 180 or the 5GC 190 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Some non-limiting examples of UEs 110 may include a session initiation protocol (SIP) phone, a satellite radio, a global positioning system, a multimedia device, a video device, a digital audio player (e.g., MP3 player), a camera, a game console, a smart device, a wearable device, a vehicle, an electric meter, a gas pump, a large or small kitchen appliance, a healthcare device, an implant, a sensor/actuator, a display, or any other similar functioning device. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. Some examples of IoT devices may include parking meter, gas pump, toaster, vehicles, and heart monitor. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The communication links 135 may use multiple-input and multiple-output (MIMO) antenna technology, including spatial multiplexing, beamforming, and/or transmit diversity. The base stations 105 and UEs 110 may use spectrum up to Y MHz (e.g., 5, 10, 15, 20, 30, 50, 100, 200, 400, etc, MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

The small cell may operate in a licensed and/or an unlicensed frequency spectrum. When operating in an unlicensed frequency spectrum, the small cell may employ NR and use the same 5 GHz unlicensed frequency spectrum as used by the Wi-Fi AP. The small cell, employing NR in an unlicensed frequency spectrum, may boost coverage to and/or increase capacity of the access network.

A base station 105, whether a small cell or a large cell (e.g., macro base station), may include an eNB, gNodeB (gNB), or other type of base station. Some base stations 105, such as a gNB may operate in a traditional sub 6 GHz spectrum, in millimeter wave (mmW) frequencies and/or near mmW frequencies in communication with the UE 110. When the gNB, such as a base station 105 operates in mmW or near mmW frequencies, the base station 105 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band has extremely high path loss and a short range. The mmW base station 105 may utilize beamforming with the UEs 110 in their transmissions to compensate for the extremely high path loss and short range.

In a non-limiting example, the EPC 180 may include a Mobility Management Entity (MME) 181, other MMES 182, a Serving Gateway 183, a Multimedia Broadcast Multicast Service (MBMS) Gateway 184, a Broadcast Multicast Service Center (BM-SC) 185, and a Packet Data Network (PDN) Gateway 186. The MME 181 may be in communication with a Home Subscriber Server (HSS) 187. The MME 181 is the control node that processes the signaling between the UEs 110 and the EPC 180. Generally, the MME 181 provides bearer and connection management. All user Internet protocol (IP) packets are transferred through the Serving Gateway 183, which itself is connected to the PDN Gateway 186. The PDN Gateway 186 provides UE IP address allocation as well as other functions. The PDN Gateway 186 and the BM-SC 185 are connected to the IP Services 188. The IP Services 188 may include the Internet, an intranet, an IP Multimedia Subsystem (IMS), a PS Streaming Service, and/or other IP services. The BM-SC 185 may provide functions for MBMS user service provisioning and delivery. The BM-SC 185 may serve as an entry point for content provider MBMS transmission, may be used to authorize and initiate MBMS Bearer Services within a public land mobile network (PLMN), and may be used to schedule MBMS transmissions. The MBMS Gateway 184 may be used to distribute MBMS traffic to the base stations 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem, a PS Streaming Service, and/or other IP services.

Figure 2:
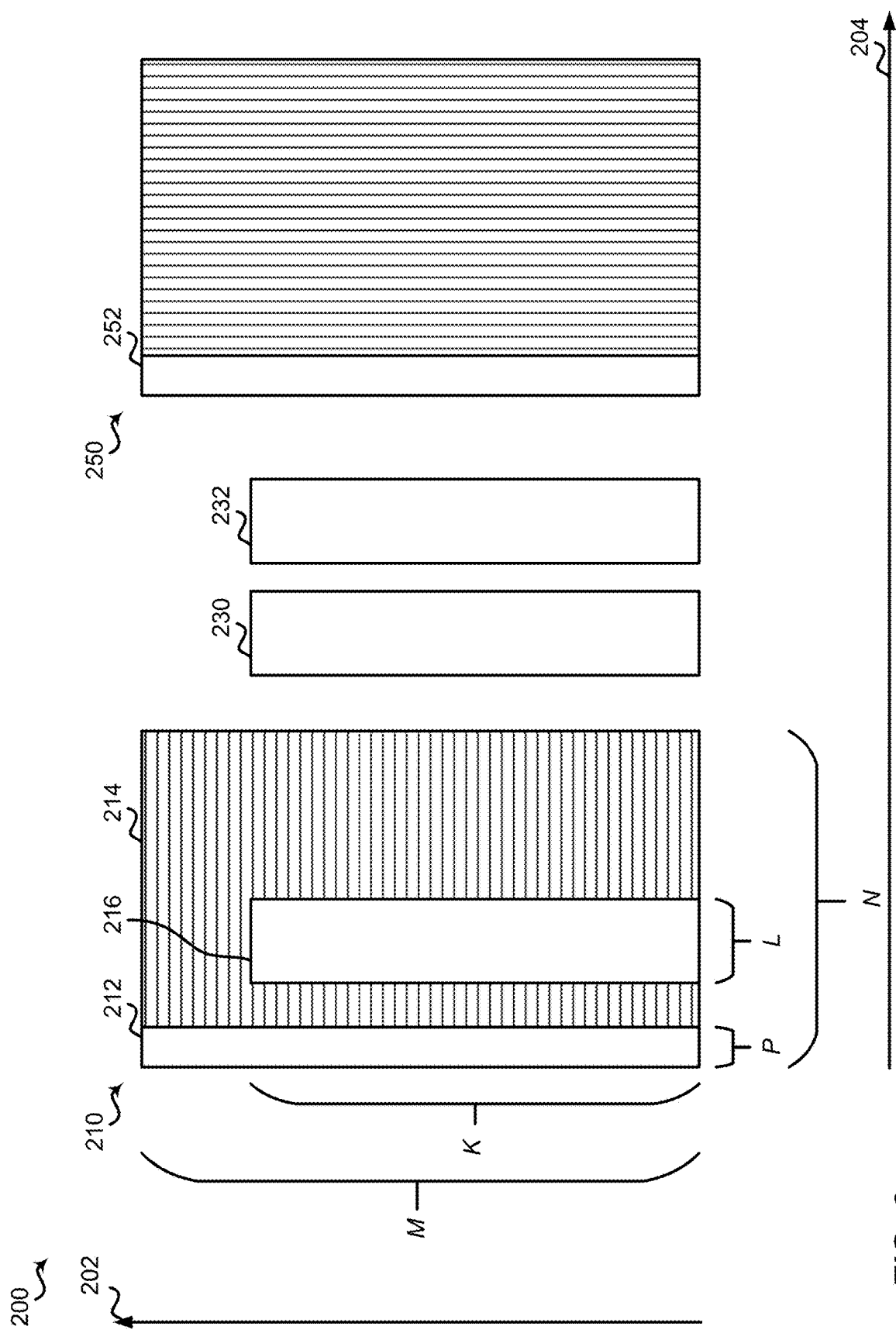
FIG. 2 is an example of remaining minimum system information received by the UE.

FIG. 2 illustrates an example of a RMSI 200 sent by a BS 105 and received by a UE 110. The RMSI 200 may occupy a number of resource blocks and slots. A resource block axis 202 may represent the resource blocks indices used by the RMSI 200 and a slot axis 204 may represent the slot indices used by the RMSI 200. In some implementations, the RMSI 200 includes a first RMSI message 210, a second SSB 230, a third SSB 232, and a second RMSI message 250. The first RMSI message 210 may include a first RMSI CORESET 212, a first RMSI PDSCH information 214 and a first SSB 216. The second RMSI message 250 may include a second RMSI CORESET 252.

In some implementations, the first RMSI message 210 may occupy M resource blocks over N slots. The first RMSI CORESET 212 may occupy M resource blocks over P slots. The first SSB 216 may occupy K resource blocks over L slots. In some examples, K is less than M (K<M), P is less than L, and L is less than N (P<L<N).

In certain implementations, the BS 105 may utilize all or some of the available resource blocks in the first RMSI PDSCH information 214 to transmit initialization information for the UE 110 to connect to the BS 105. The number of resource blocks in the first RMSI PDSCH information 214 may be computed by the computation component 150 to be (M×N)−((M×P)±(K×L)).

Figure 3:
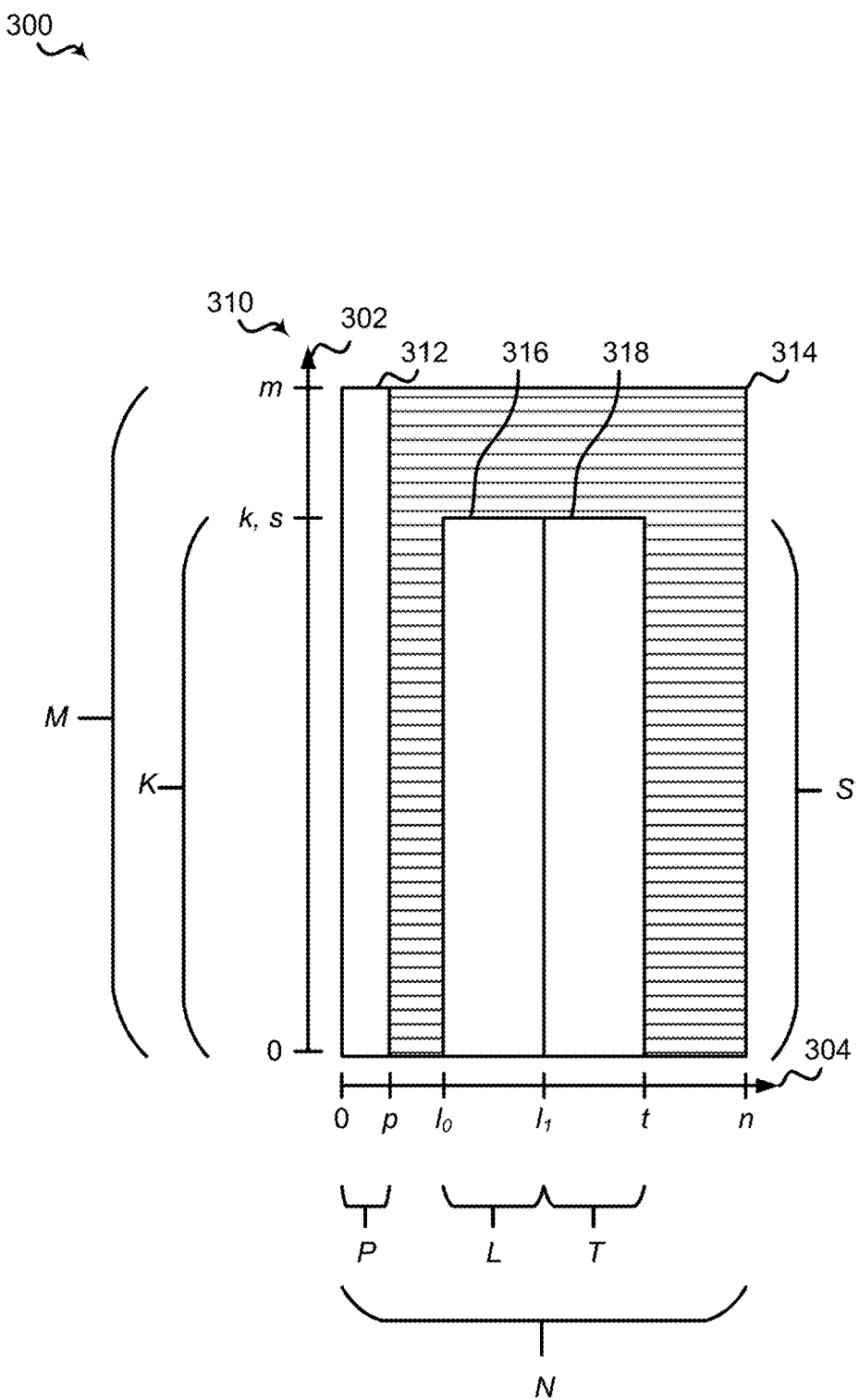
FIG. 3 is another example of remaining minimum system information received by the UE.

FIG. 3 illustrates another example of RMSI 300 sent by the BS 105 to the UE 110. The RMSI 300 includes a RMSI message 310. A resource block axis 302 may represent the resource blocks indices used by the RMSI message 310 and a slot axis 304 may represent the slot indices used by the RMSI 300. The RMSI message 310 includes a RMSI CORESET 312, a first and second SSBs 316, 318, and RMSI PDSCH information 314.

In some implementations, the RMSI message 310 may occupy M resource blocks (spanning from resource block index of 0 to m) over N slots (spanning from slot index of 0 to n). The RMSI CORESET 312 may occupy M resource blocks over P slots (spanning from slot index of 0 top). The first SSB 316 may occupy K resource blocks over L slots and the second SSB 318 may occupy S resource block over T slots. The resource block indices of the first SSB 316 may be from 0 to k, and the slot indices of the first SSB 316 may be from $l_0$ to $l_1$. The resource block indices of the second SSB 318 may be from 0 to s, and the slot indices of the second SSB 318 may be from $l_1$ to t. As shown in FIG. 3, K may be the same as S. In other aspects, K may be the different from S. In some examples, K and S are less than M (K,S<M), P is less than L and T, and L and T are less than N (P<L, T<N).

Still referring to FIG. 3, in some implementations, the BS 105 may indicate the boundaries of the first and second SSBs 316, 318 by embedding the boundary information in the CORESET 312. The UE 110 may identify the boundaries of the first and second SSBs 316, 318 using the boundary information. In one example, the boundary information may include the starting indices (for resource block and slot) for the first and second SSBs 316, 318 and the associated length information. In this example, the boundary information includes "0" and "K" to indicate the starting index and length of the resource blocks occupied by the first SSB 316, and "$l_0$" and "L" to indicate the starting index and length of the slots occupied by the first SSB 316. The boundary information may further include "0" and "S" to indicate the starting index and length of the resource blocks occupied by the second SSB 318, and "$l_1$" and "T" to indicate the starting index and length of the slots occupied by the second SSB 318. In another example, the boundary information may include the starting indices (for resource block and slot) for the first and second SSBs 316, 318 and the ending indices (for resource block and slot) for the first and second SSBs 316, 318. In this example, the boundary information includes "0" and "k" to indicate the starting index and ending index of the resource blocks occupied by the first SSB 316, and "$l_0$" and "$l_1$" to indicate the starting index and ending index of the slots occupied by the first SSB 316. The boundary information may further include "0" and "s" to indicate the starting index and ending index of the resource blocks occupied by the second SSB 318, and "$l_0$" and "t" to indicate the starting index and ending index of the slots occupied by the second SSB 318.

Still referring to FIG. 3, the computation component 150 may utilize the boundary information to identify the number and location of the resource blocks allocated for the RMSI PDSCH information 314. For example, the number of resource blocks occupied by the RMSI PDSCH information 314 may be calculated, by the computation component 150, to be (M×N)−((M×P)+((K×L)+(S×T))). The locations of the resource blocks may span resource blocks from resource block indices between 0 to m and slot indices between p to $l_0$, resource blocks from resource block indices between k to m and slot indices between $l_0$ to $l_1$, resource blocks from resource block indices between s to m and slot indices between $l_1$ to t, and resource blocks from resource block indices between 0 to m and slot indices between t to n.

In some implementations, the computation component 150 of the UE 110 may identify the number and location of the resource blocks allocated for the RMSI PDSCH information 314 based on the combined boundary information of the first and second SSBs 316, 318. For example, the combined boundary information may indicate that the resource blocks allocated for the RMSI PDSCH information 314 are all resource blocks from resource block indices between 0 to m and slot indices between p to n except for resources blocks from resource block indices between 0 to k (assuming k=s) and slot indices between $l_0$ to t. In a different example of a representation, the computation component 150 may identify the number and location of the resource blocks allocated for the CORESET 312 and the RMSI PDSCH information 314 using the combined boundary information. In this representation, the combined boundary information may include the resource block and slot indices information of the first and second SSBs 316, 318. The UE 110, via the computation component 150, may identify the number and location of the resource blocks allocated for the CORESET 312 and the RMSI PDSCH information 314 as all resource blocks from resource block indices between 0 to m and slot indices between 0 to n except for resources blocks from resource block indices between 0 to k (assuming k=s) and slot indices between $l_0$ to t. Other suitable representations may also be used by the BS 105 to convey the boundary information to the UE 110. In the examples above, the network resource may be efficiently utilized to transmit RMSI PDSCH information 314.

Turning now to FIG. 4, a table 400 illustrates fields, transmitted by the BS 105, the UE 110 may use to perform rate matching of RMSI PDSCH. The K0 values of half-frame duration and slot offset field may include, for example, two bits that indicate if there is a delay in the transmission of a SSB by half of a frame (e.g. 5 milliseconds). The start and length of PDSCH Symbol field may include, for example, three bits that indicate the starting index and/or the length of the SSB resource blocks. The SSB Bitmap field may include, for example, two bits to indicate the number of SSB in a RMSI message. For example, the RateMatch SSB Bitmap may have a value of "00" when a RMSI message includes no SSB. Further the RateMatch SSB Bitmap may have values of "01", "10", or "11" to indicate that a RMSI message has a SSB in the first available slot, the second available slot, or both available slots, respectively. The Entire Symbol vs Only SSB field may include, for example, a bit to indicate whether the UE 110 should perform rate matching around one or more SSBs or not. For example, in millimeter wave transmission, it may be difficult to code RMSI PDSCH information around a SSB. In this circumstance, the BS 105 may indicate to the UE 110, via the SS/PBCH Symbol, to not perform rate match around the SSB.

Figure 5:
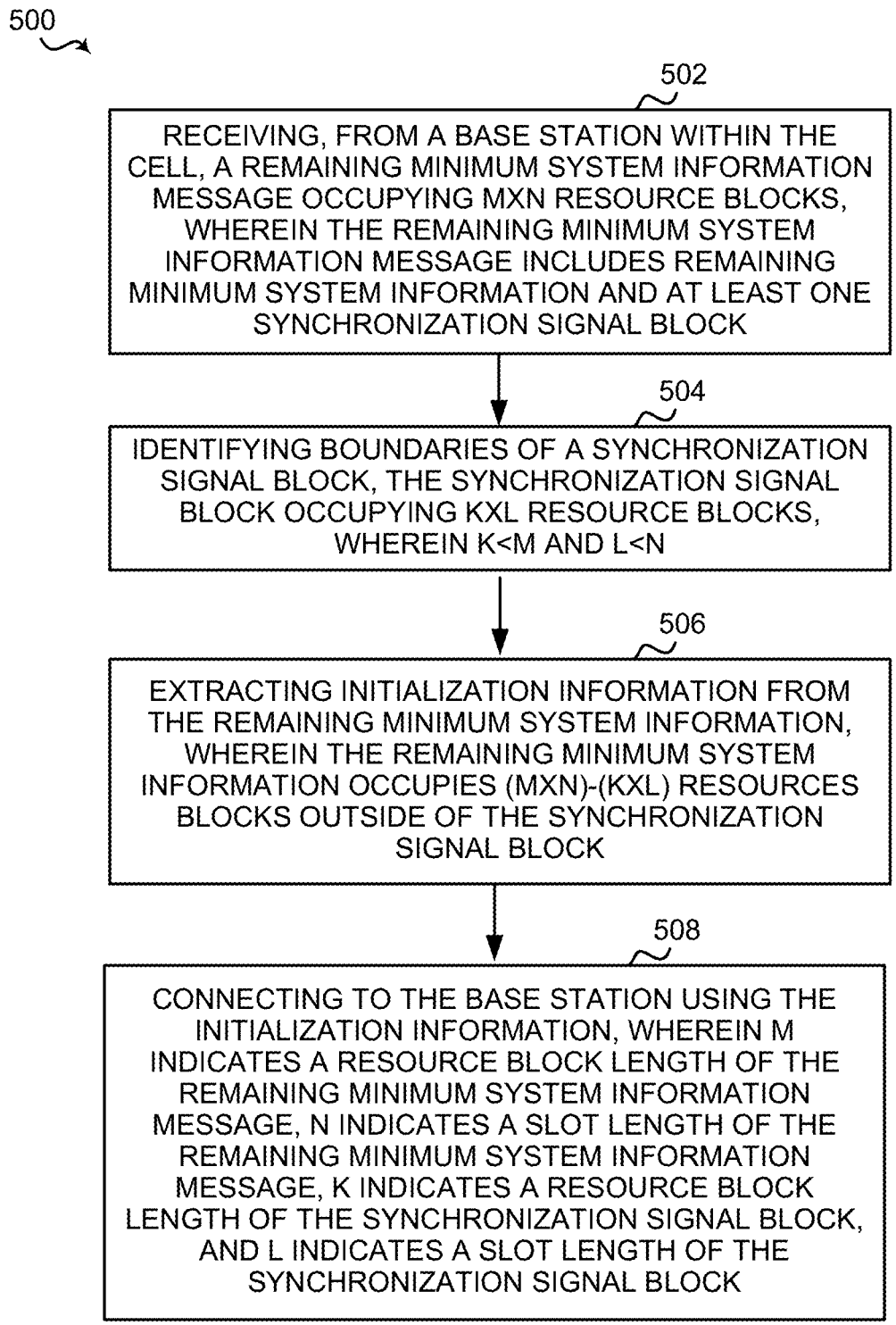
FIG. 5 is a flow chart showing an example of a method for initializing the UE.

Referring to FIG. 5, the UE 110 may perform an example of a method 500 of rate matching around a SSB. At block 502, the method 500 may receive, from a base station within the cell, a remaining minimum system information message occupying M×N resource blocks, wherein the remaining minimum system information message includes remaining minimum system information and at least one synchronization signal block. For example, the communication component 154 may receive, from the communication component 170 of the BS 105 in a cell of the geographic coverage area 130, a remaining minimum system information message occupying M×N resource blocks, wherein the remaining minimum system information message includes remaining minimum system information and at least one synchronization signal block, such as the RMSI message 310 and the first SSB 316. In a non-limiting example, the RMSI message 310 may occupy M resource blocks (spanning from resource block index of 0 to m) over N slots (spanning from slot index of 0 to n). The first SSB 316 may occupy K resource blocks over L slots. The resource block indices of the first SSB 316 may be from 0 to k, and the slot indices of the first SSB 316 may be from $l_0$ to $l_1$. The remaining minimum system information message may be encoded by the encoding component 172 of the BS 105.

Figure 7:
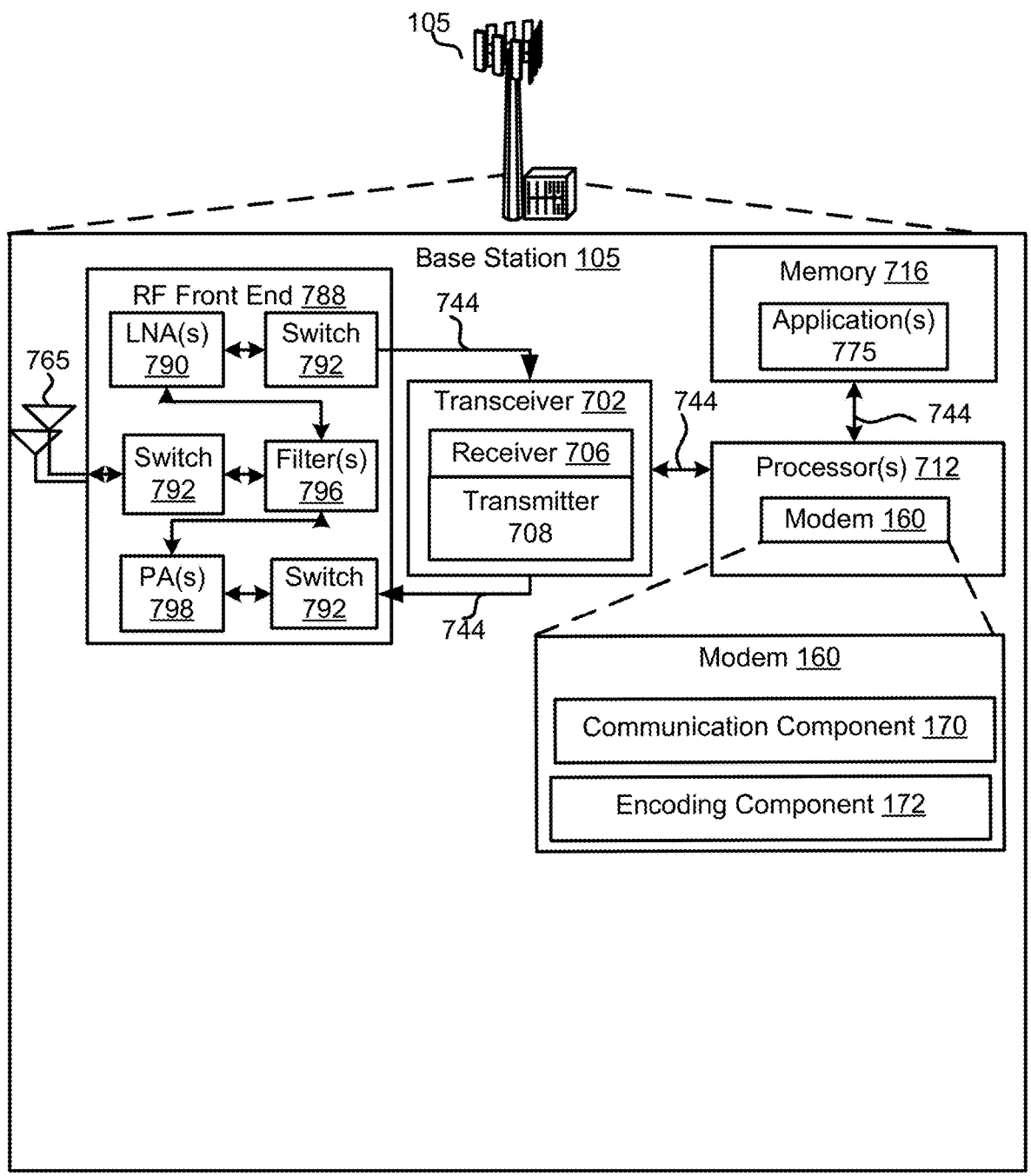
FIG. 7 is a schematic diagram of an example of a base station.

In particular, still referring to FIG. 5 and referencing FIG. 7, the encoding component 172 may encode the remaining minimum system information message, and send the encoded message to the communication component 170 of the BS 105. The communication component 170 of the BS may send the digitally encoded message from the modem 160 in processor(s) 712 to a transceiver 712 or transmitter 708. The transceiver 712 or transmitter 708 may convert the digitally encoded RMSI message into electrical signals and send the electrical signals to one or more power amplifiers (PAs) 798 through switches 792 and one or more buses 744. The one or more PAs then amplify the electrical signals and one or more antennas 765 transmit the electro-magnetic signals (representing the RMSI message) toward the UE 110. One or more antennas 765 of the UE 110 may receive the transmitted electro-magnetic signals, and send converted electrical signals to one or more low noise amplifiers (LNAs) 690 via switches 692. The LNAs 690 may amplify the electrical signals and send the amplified signals to a transceiver 602 or receiver 606 via one or more buses 644. The transceiver 602 or receiver 606 may convert the amplified electrical signals back to the digitally encoded RMSI message and send the RMSI message to the communication component 154 of the UE 110.

At block 504, the method 500 may identify boundaries of a synchronization signal block, the synchronization signal block occupying K×L resource blocks, wherein K<M and L<N. For example, the computation component 150 may identify boundaries of a synchronization signal block, the synchronization signal block occupying K×L resource blocks, wherein K<M and L<N, as described above with respect to FIGS. 2 and 3. The boundaries may be defined by the starting indices (for resource block and slot) for the synchronization signal block and the associated length information. Alternatively, the boundaries may be defined by the starting indices and the ending indices (for resource block and slot) for the synchronization signal block. The boundary information may be embedded in the CORESET, such as the CORESET 312. The boundary information may include "0" and "k" to indicate the starting index and ending index of the resource blocks occupied by the first SSB 316, and "$l_0$" and "$l_1$" to indicate the starting index and ending index of the slots occupied by the first SSB 316. In a non-limiting example, the computation component 150 may identify the boundaries of the SSB, such as the first SSB 316, based on the boundary information. The first SSB 316 may occupy K resource blocks over L slots. The resource block indices of the first SSB 316 may be from 0 to k, and the slot indices of the first SSB 316 may be from $l_0$ to $l_1$.

At block 506, the method 500 may extract initialization information from the control resource set information, wherein the control resource set information occupies (M×N)−(K×L) resources blocks outside of the K×L resource blocks of the synchronization block. For example, the initialization component 152 may extract initialization information from the control resource set information, wherein the control resource set information occupies (M×N)−(K×L) resources blocks outside of the K×L resource blocks of the synchronization block. In certain examples, the initialization component 152 may obtain the RMSI PDSCH information 314 from the CORESET. The initialization information may include information such as public land mobile network identity, cell identity, periodicity, configuration ID, availability information, or scheduling information.

At block 508, the method 500 may connect to the base station using the initialization information, wherein M indicates a resource block length of the remaining minimum system information message, N indicates a slot length of the remaining minimum system information message, K indicates a resource block length of the synchronization signal block, and L indicates a slot length of the synchronization signal block. For example, the communication component 154 may connect to the base station 105 using the initialization information, wherein M indicates a resource block length of the remaining minimum system information message, N indicates a slot length of the remaining minimum system information message, K indicates a resource block length of the synchronization signal block, and L indicates a slot length of the synchronization signal block. The communication component 154 may rely on one or more of the public land mobile network identity, cell identity, periodicity, configuration ID, availability information, or scheduling information, plus other information (e.g., master information block information), to connect to the BS 105.

In certain implementations, the UE 110 may receive broadcasted initialization information via PBCH, and connects to the BS 105 using both the initialization information and the broadcasted initialization information. The broadcasted initialization information may include the master information block, the physical HARQ indicator, and other information for joining the network.

Figure 6:
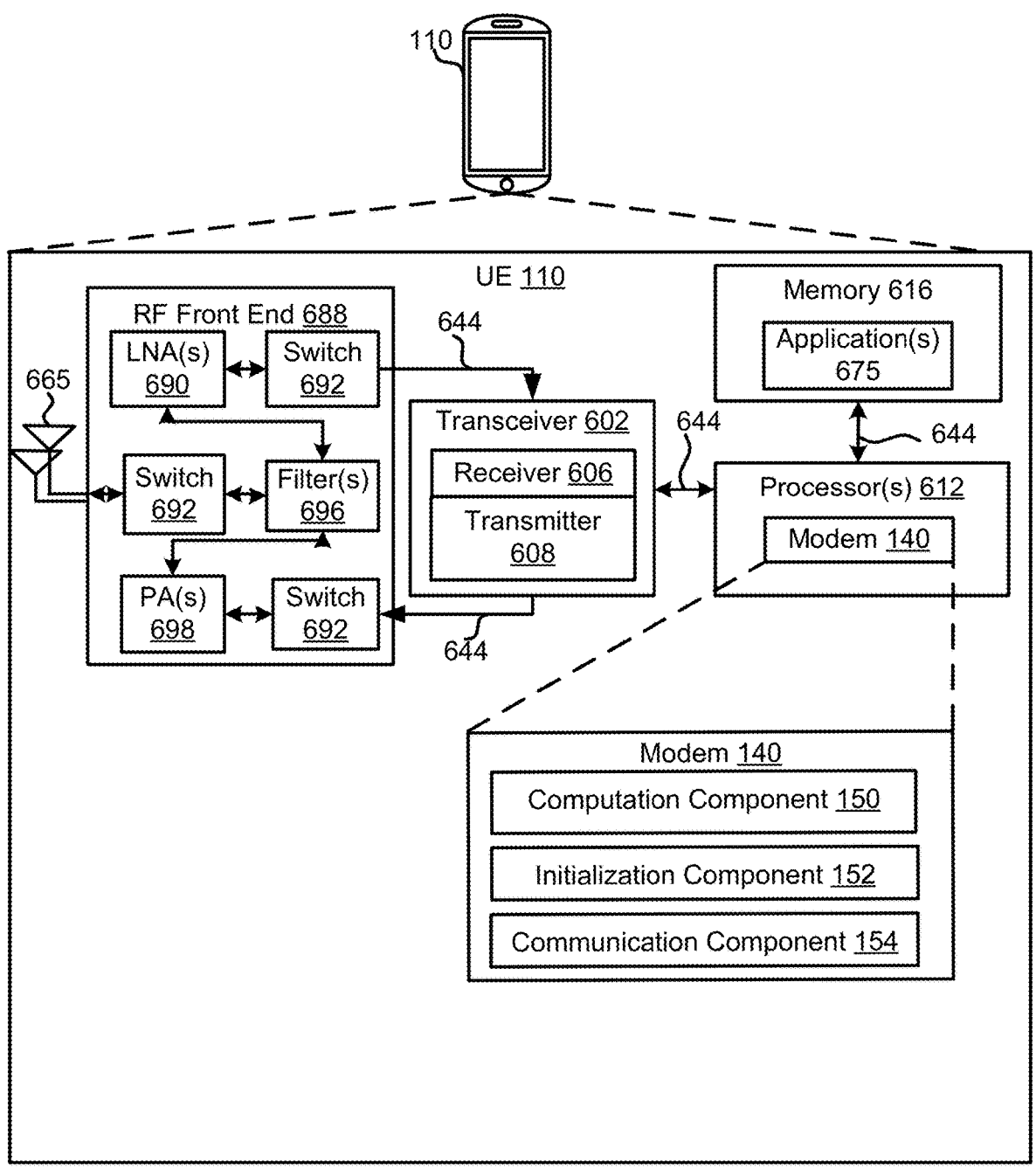
FIG. 6 is a schematic diagram of an example of a user equipment.

Referring to FIG. 6, one example of an implementation of the UE 110 may include a variety of components, some of which have already been described above, but including components such as one or more processors 612 and memory 616 and transceiver 602 in communication via one or more buses 644, which may operate in conjunction with the modem 140, the computation component 150, the initialization component 152, and the communication component 154 to enable one or more of the functions described herein related to communicating with the BS 105. Further, the one or more processors 612, modem 140, memory 616, transceiver 602, RF front end 688 and one or more antennas 665, may be configured to support voice and/or data calls (simultaneously or non-simultaneously) in one or more radio access technologies.

In an aspect, the one or more processors 612 may include the modem 140 that uses one or more modem processors. The various functions related to the computation component 150, the initialization component 152, and the communication component 154 may be included in modem 140 and/or processors 612 and, in an aspect, may be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or the modem 140 associated with the communication component 154 may be performed by transceiver 602.

Also, memory 616 may be configured to store data used herein and/or local versions of applications 675 or the communication component 154 and/or one or more subcomponents of the communication component 154 being executed by at least one processor 612. Memory 616 may include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining the communication component 154 and/or one or more of the subcomponents, and/or data associated therewith, when UE 110 is operating at least one processor 612 to execute the computation component 150, the initialization component 152, and the communication component 154 and/or one or more of their subcomponents.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a radio frequency (RF) receiver. In an aspect, receiver 606 may receive signals transmitted by at least one base station 105. Additionally, receiver 606 may process such received signals, and also may obtain measurements of the signals, such as, but not limited to, Ec/Io, SNR, RSRP, RSSI, etc. Transmitter 608 may include hardware, firmware, and/or software code executable by a processor for transmitting data, the code comprising instructions and being stored in a memory (e.g., computer-readable medium). A suitable example of transmitter 608 may including, but is not limited to, an RF transmitter.

Moreover, in an aspect, UE 110 may include RF front end 688, which may operate in communication with one or more antennas 665 and transceiver 602 for receiving and transmitting radio transmissions, for example, wireless communications transmitted by at least one base station 105 or wireless transmissions transmitted by UE 110. RF front end 688 may be coupled with one or more antennas 665 and may include one or more low-noise amplifiers (LNAs) 690, one or more switches 692, one or more power amplifiers (PAs) 698, and one or more filters 696 for transmitting and receiving RF signals.

In an aspect, LNA 690 may amplify a received signal at a desired output level. In an aspect, each LNA 690 may have a specified minimum and maximum gain values. In an aspect, RF front end 688 may use one or more switches 692 to select a particular LNA 690 and the specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 688 may use one or more switches 692 to select a particular PA 698 and the specified gain value based on a desired gain value for a particular application.

Also, for example, one or more filters 696 may be used by RF front end 688 to filter a received signal to obtain an input RF signal. Similarly, in an aspect, for example, a respective filter 696 may be used to filter an output from a respective PA 698 to produce an output signal for transmission. In an aspect, each filter 696 may be coupled with a specific LNA 690 and/or PA 698. In an aspect, RF front end 688 may use one or more switches 692 to select a transmit or receive path using a specified filter 696, LNA 690, and/or PA 698, based on a configuration as specified by transceiver 602 and/or processor 612.

As such, transceiver 602 may be configured to transmit and receive wireless signals through one or more antennas 665 via RF front end 688. In an aspect, transceiver may be tuned to operate at specified frequencies such that UE 110 may communicate with, for example, one or more base stations 105 or one or more cells associated with one or more base stations 105. In an aspect, for example, the modem 140 may configure transceiver 602 to operate at a specified frequency and power level based on the UE configuration of the UE 110 and the communication protocol used by the modem 140.

In an aspect, the modem 140 may be a multiband-multimode modem, which may process digital data and communicate with transceiver 602 such that the digital data is sent and received using transceiver 602. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of UE 110 (e.g., RF front end 688, transceiver 602) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network during cell selection and/or cell reselection.

Referring to FIG. 7, one example of an implementation of base station 105 may include a variety of components, some of which have already been described above, but including components such as one or more processors 712 and memory 716 and transceiver 702 in communication via one or more buses 744, which may operate in conjunction with the modem 160 and the communication component 170 to enable one or more of the functions described herein related to rate matching of PDSCH around existing SSBs. The transceiver 702, receiver 706, transmitter 708, one or more processors 712, memory 716, applications 775, buses 744, RF front end 788, LNAs 790, switches 792, filters 796, Pas 798, and one or more antennas 765 may be the same as or similar to the corresponding components of the UE 110, as described above, but configured or otherwise programmed for base station operations as opposed to UE operations.

In an aspect, the one or more processors 712 may include the modem 160 that uses one or more modem processors. The various functions related to the communication component 170 and the encoding component 172 may be included in modem 160 and/or processors 712 and, in an aspect, may be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. In other aspects, some of the features of the one or more processors 712 and/or the modem 160 associated with the communication component 170 may be performed by transceiver 702.

Also, memory 716 may be configured to store data used herein and/or local versions of applications 775 or the communication component 170 and/or one or more subcomponents of the communication component 170 being executed by at least one processor 712. Memory 716 may include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, memory 716 may be a non-transitory computer-readable storage medium that stores one or more computer-executable codes defining the communication component 170 and/or one or more of the subcomponents, and/or data associated therewith, when UE 110 is operating at least one processor 712 to execute the communication component 170, the encoding component 172, and/or one or more of the subcomponents.

Transceiver 702 may include at least one receiver 706 and at least one transmitter 708. Receiver 706 may include hardware, firmware, and/or software code executable by a processor for receiving data, the code comprising instructions and being stored in a memory (e.g., computer-readable medium). Receiver 706 may be, for example, a radio frequency (RF) receiver. In an aspect, receiver 706 may receive signals transmitted by at least one base station 105. Additionally, receiver 706 may process such received signals, and also may obtain measurements of the signals, such as, but not limited to, Ec/Io, SNR, RSRP, RSSI, etc. Transmitter 708 may include hardware, firmware, and/or software code executable by a processor for transmitting data, the code comprising instructions and being stored in a memory (e.g., computer-readable medium). A suitable example of transmitter 708 may including, but is not limited to, an RF transmitter.

Moreover, in an aspect, UE 110 may include RF front end 788, which may operate in communication with one or more antennas 765 and transceiver 702 for receiving and transmitting radio transmissions, for example, wireless communications transmitted by at least one base station 105 or wireless transmissions transmitted by UE 110. RF front end 788 may be coupled with one or more antennas 765 and may include one or more low-noise amplifiers (LNAs) 790, one or more switches 792, one or more power amplifiers (PAs) 798, and one or more filters 796 for transmitting and receiving RF signals.

In an aspect, LNA 790 may amplify a received signal at a desired output level. In an aspect, each LNA 790 may have a specified minimum and maximum gain values. In an aspect, RF front end 788 may use one or more switches 792 to select a particular LNA 790 and the specified gain value based on a desired gain value for a particular application.

Further, for example, one or more PA(s) 798 may be used by RF front end 788 to amplify a signal for an RF output at a desired output power level. In an aspect, each PA 798 may have specified minimum and maximum gain values. In an aspect, RF front end 788 may use one or more switches 792 to select a particular PA 798 and the specified gain value based on a desired gain value for a particular application.

Also, for example, one or more filters 796 may be used by RF front end 788 to filter a received signal to obtain an input RF signal. Similarly, in an aspect, for example, a respective filter 796 may be used to filter an output from a respective PA 798 to produce an output signal for transmission. In an aspect, each filter 796 may be coupled with a specific LNA 790 and/or PA 798. In an aspect, RF front end 788 may use one or more switches 792 to select a transmit or receive path using a specified filter 796, LNA 790, and/or PA 798, based on a configuration as specified by transceiver 702 and/or processor 712.

As such, transceiver 702 may be configured to transmit and receive wireless signals through one or more antennas 765 via RF front end 788. In an aspect, transceiver may be tuned to operate at specified frequencies such that UE 110 may communicate with, for example, one or more base stations 105 or one or more cells associated with one or more base stations 105. In an aspect, for example, the modem 160 may configure transceiver 702 to operate at a specified frequency and power level based on the UE configuration of the UE 110 and the communication protocol used by the modem 160.

In an aspect, the modem 160 may be a multiband-multimode modem, which may process digital data and communicate with transceiver 702 such that the digital data is sent and received using transceiver 702. In an aspect, the modem 160 may be multiband and be configured to support multiple frequency bands for a specific communications protocol. In an aspect, the modem 160 may be multimode and be configured to support multiple operating networks and communications protocols. In an aspect, the modem 160 may control one or more components of UE 110 (e.g., RF front end 788, transceiver 702) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network during cell selection and/or cell reselection.

Figure 8:
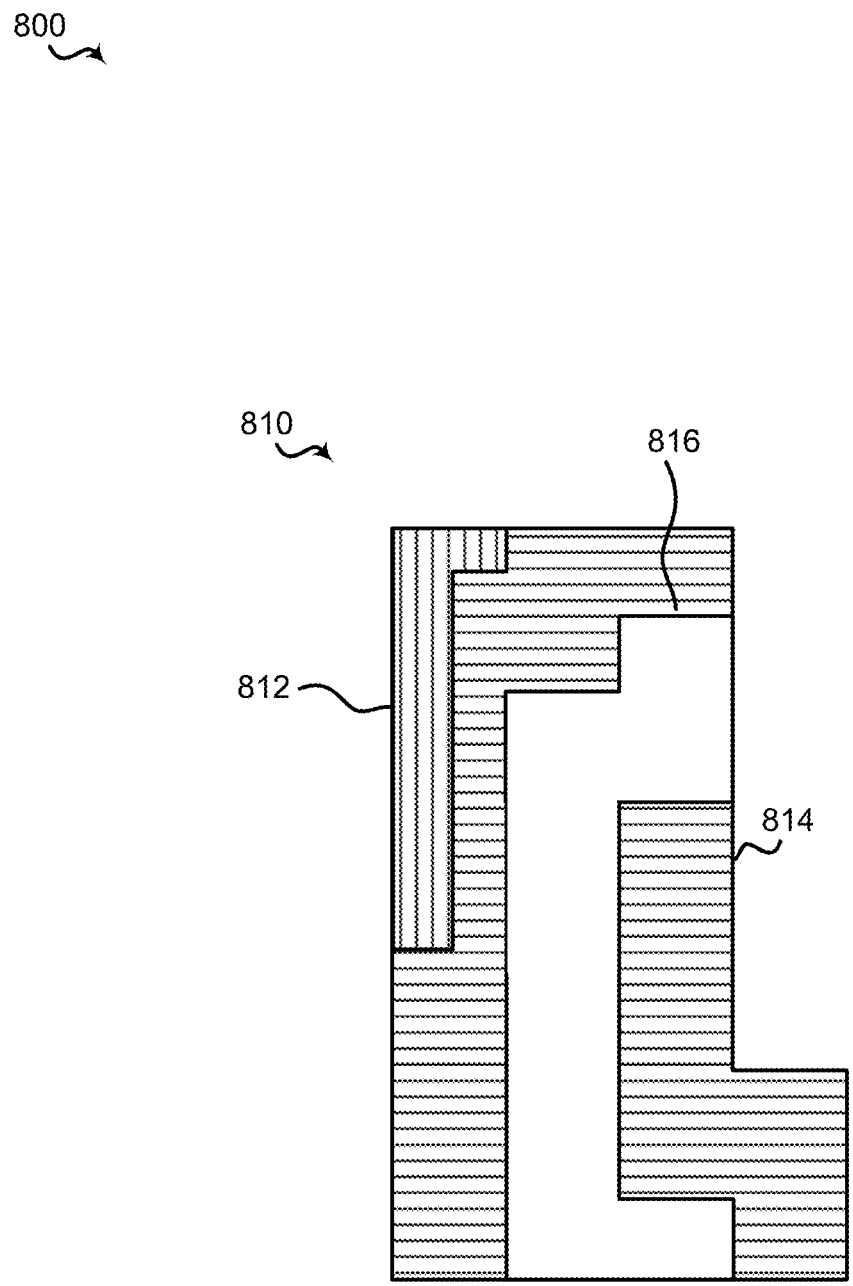
FIG. 8 is another example of remaining minimum system information received by the UE.

FIG. 8 illustrates another example of RMSI 800 sent by the BS 105 to the UE 110. The RMSI 800 includes a RMSI message 810. The RMSI message 810 includes a RMSI CORESET 812, a SSB 816 and RMSI PDSCH information 814. The RMSI message 810 may occupy a set of D resource elements. Each of the RMSI CORESET 812, the SSB 816, and the RMSI PDSCH information 814 may occupy a subset of the set of D resource elements. For example, the RMSI CORESET 812 may be a first subset of the set of D resource elements where the first subset has E resource elements. The SSB 816 may be a second subset of the set of D resource elements where the second subset has F resource elements. The RMSI PDSCH information 814 may be a third subset of the set of D resource elements where the third subset has G resource elements. The first, second, and third subsets may have zero or some overlapping resource elements. The UE 110 may utilize the RMSI PDSCH information 814 in the G resource elements to for initialization. While the RMSI CORESET 812, SSB 816, and RMSI PDSCH information 814 are polygons, they may be rectangular as the RMSI CORESET 312, SSB 316, and RMSI PDSCH information 314 in FIG. 3. In a non-limiting example, a RMSI may have a rectangular RMSI CORESET, a square SSB, and a polygonal RMSI PDSCH information. In another non-limiting example, a RMSI may have a polygonal RMSI CORESET, a rectangular SSB, and a rectangular RMSI PDSCH information. Other arrangements are possible.

Figure 9:
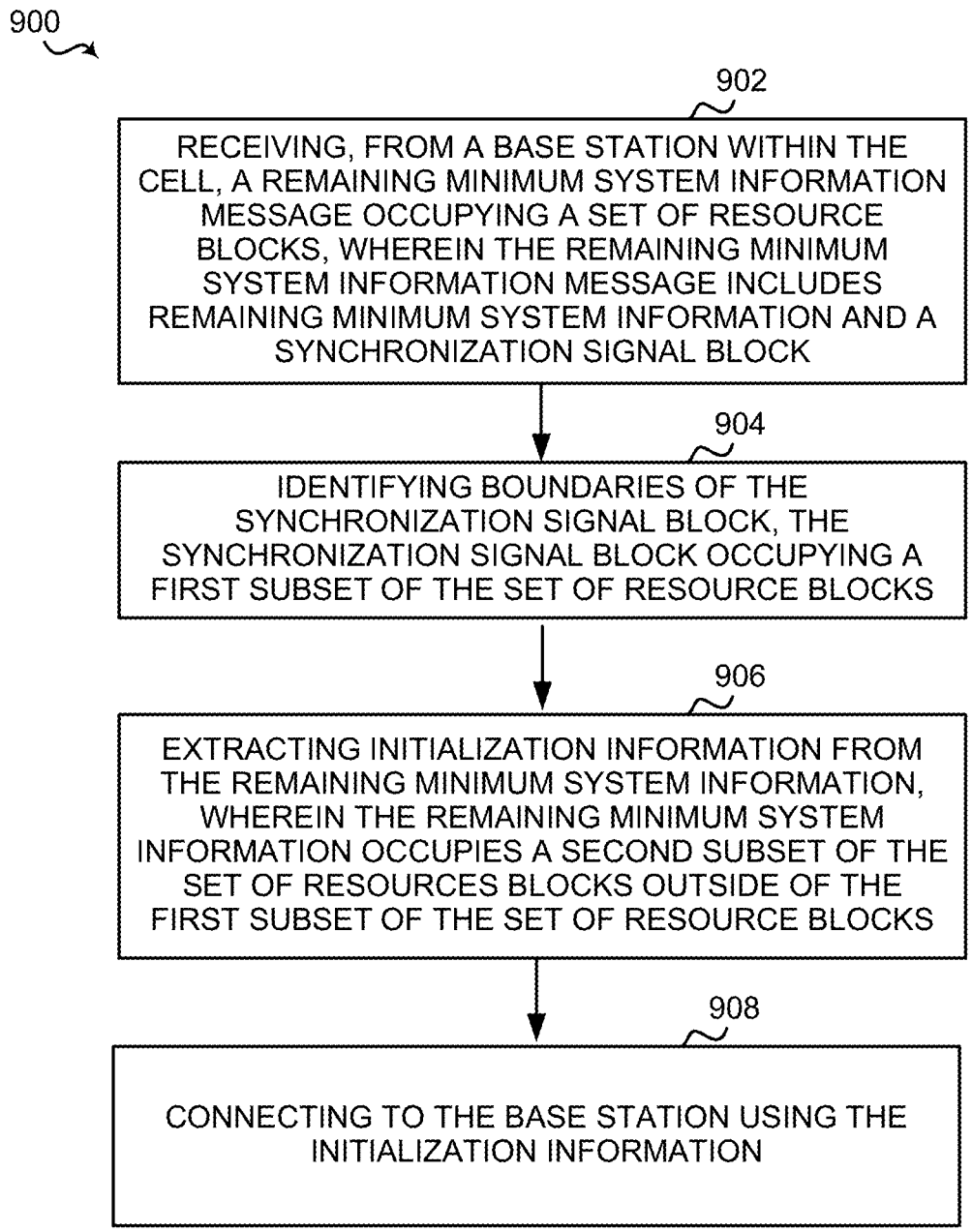
FIG. 9 is a flow chart showing another example of a method for initializing the UE.

Referring to FIG. 9, the UE 110 may perform an example of a method 900 of rate matching around a SSB. At block 902, the method 900 may receive, from a base station within the cell, a remaining minimum system information message occupying a set of resource blocks, wherein the remaining minimum system information message includes remaining minimum system information and a synchronization signal block. For example, the communication component 154 may receive, from the communication component 170 of the BS 105 in a cell of the geographic coverage area 130, a remaining minimum system information message occupying a set of resource blocks, wherein the remaining minimum system information message includes remaining minimum system information and a synchronization signal block, such as the RMSI message 310 and the first SSB 316. In a non-limiting example, the RMSI message 310 may occupy M resource blocks (spanning from resource block index of 0 to m) over N slots (spanning from slot index of 0 to n). The first SSB 316 may occupy K resource blocks over L slots. The resource block indices of the first SSB 316 may be from 0 to k, and the slot indices of the first SSB 316 may be from $l_0$ to $l_1$. The remaining minimum system information message may be encoded by the encoding component 172 of the BS 105.

In particular, still referring to FIG. 9 and referencing FIG. 7, the encoding component 172 may encode the remaining minimum system information message, and send the encoded message to the communication component 170 of the BS 105. The communication component 170 of the BS may send the digitally encoded message from the modem 160 in processor(s) 712 to the transceiver 712 or the transmitter 708. The transceiver 712 or transmitter 708 may convert the digitally encoded RMSI message into electrical signals and send the electrical signals to the one or more power amplifiers (PAs) 798 through the witches 792 and the one or more buses 744. The one or more PAs then amplify the electrical signals and the one or more antennas 765 transmit the electro-magnetic signals (representing the RMSI message) toward the UE 110. The one or more antennas 665 of the UE 110 may receive the transmitted electro-magnetic signals, and send converted electrical signals to the one or more low noise amplifiers (LNAs) 690 via switches 692. The LNAs 690 may amplify the electrical signals and send the amplified signals to the transceiver 602 or the receiver 606 via the one or more buses 644. The transceiver 602 or the receiver 606 may convert the amplified electrical signals back to the digitally encoded RMSI message and send the RMSI message to the communication component 154 of the UE 110.

At block 904, the method 900 may identify boundaries of the synchronization signal block, the synchronization signal block occupying a first subset of the set of resource blocks. For example, the computation component 150 may identify boundaries of the synchronization signal block, the synchronization signal block occupying a first subset of the set of resource blocks, as described above with respect to FIGS. 2, 3, and 8. The boundaries may be the shape of any polygon. The boundary information may be embedded in the CORESET, such as the CORESET 312. The boundary information may include "0" and "k" to indicate the starting index and ending index of the resource blocks occupied by the first SSB 316, and "$l_0$" and "$l_1$" to indicate the starting index and ending index of the slots occupied by the first SSB 316. In a non-limiting example, the computation component 150 may identify the boundaries of the SSB, such as the first SSB 316, based on the boundary information. The first SSB 316 may occupy K resource blocks over L slots. The resource block indices of the first SSB 316 may be from 0 to k, and the slot indices of the first SSB 316 may be from $l_0$ to $l_1$.

At block 906, the method 900 may extract initialization information from the remaining minimum system information, wherein the remaining minimum system information occupies a second subset of the set of resources blocks outside of the first subset of the set of resource blocks. For example, the initialization component 152 may extract initialization information from the remaining minimum system information, wherein the remaining minimum system information occupies a second subset of the set of resources blocks outside of the first subset of the set of resource blocks. In certain examples, the initialization component 152 may obtain the RMSI PDSCH information 314 from the CORESET. The initialization information may include information such as public land mobile network identity, cell identity, periodicity, configuration ID, availability information, or scheduling information.

At block 908, the method 900 may connect to the base station using the initialization information. For example, the communication component 154 may connect to the base station using the initialization information. The communication component 154 may rely on one or more of the public land mobile network identity, cell identity, periodicity, configuration ID, availability information, or scheduling information, plus other information (e.g., master information block information), to connect to the BS 105.

In certain implementations, the UE 110 may receive broadcasted initialization information via PBCH, and connects to the BS 105 using both the initialization information and the broadcasted initialization information. The broadcasted initialization information may include the master information block, the physical HARQ indicator, and other information for joining the network.

Figure 10:
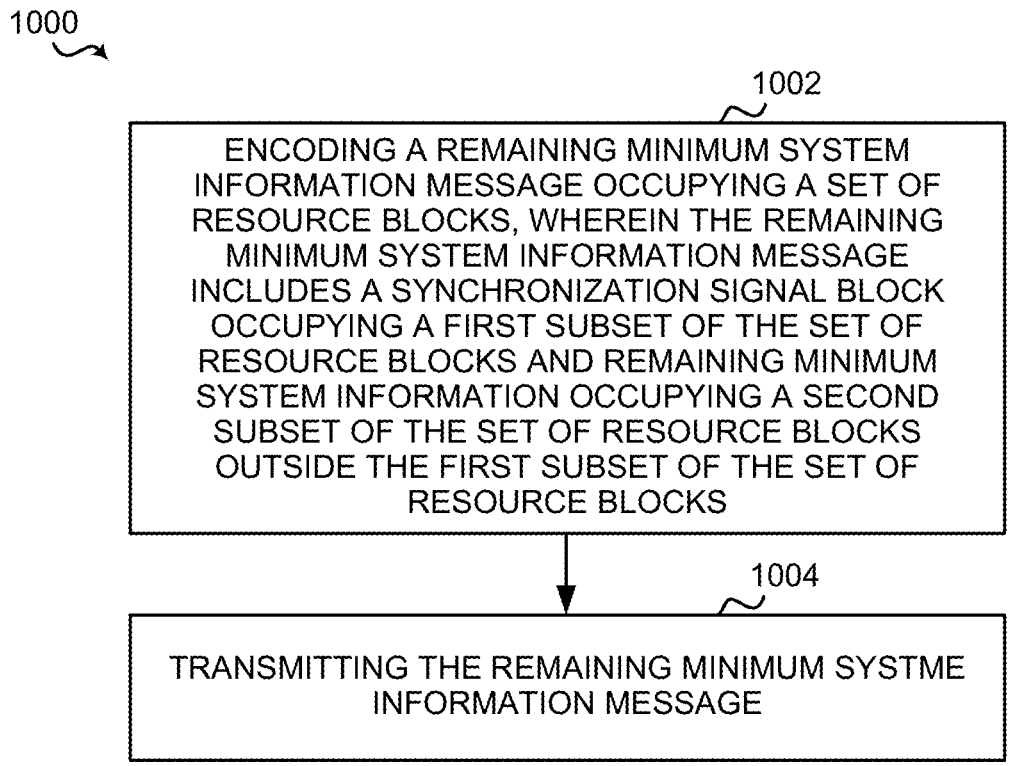
FIG. 10 is a flow chart showing an example of a method for transmitting remaining minimum system information to the UE.

Turning to FIG. 10, the BS 105 may perform an example of a method 1000 for rate-matching around a SSB. At block 1002, the method 1000 encode a remaining minimum system information message occupying a set of resource blocks, wherein the remaining minimum system information message includes a synchronization signal block occupying a first subset of the set of resource blocks and remaining minimum system information occupying a second subset of the set of resource blocks outside the first subset of the set of resource blocks. For example, the encoding component 172 of the BS 105 may encode a remaining minimum system information message, such as the RMSI message 310. The RMSI message 310 may occupy M×N resource blocks. The synchronization signal block, such as the first SSB 316, may occupy L×K resource blocks. The remaining minimum system information, such as the RMSI PDSCH information 314, may occupy resource blocks outside of the first SSB 316.

At block 1004, the method 1000 may transmit the remaining minimum system information message. For example, the communication component 170 of the BS 105 may transmit the remaining minimum system information message to the communication component 154 of the UE 110.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of initiating a user equipment in a cell, comprising:
   receiving, from a base station within the cell, a first set of resources for a synchronization signal block;
   receiving, from the base station within the cell, a grant that indicates a second set of resources allocated for system information, wherein the second set of resources is associated with a down-link control channel and scheduling of a down-link shared channel;
   determining that the second set of resources is rate matched around the first set of resources when the second set of resources overlaps the synchronization signal block;
   extracting initialization information from the system information; and
   connecting to the base station using the initialization information.

2. The method of claim 1, wherein the second set of resources is rate matched around the first set of resources when at least a first resource block of the first set of resources overlaps in time with at least a second resource block of the second set of resources.

3. The method of claim 1, further comprising receiving broadcasted initialization information, wherein connecting to the base station using the initialization information further includes connecting to the base station using the broadcasted initialization information.

4. The method of claim 1, wherein the system information includes remaining minimum system information.

5. The method of claim 4, wherein the remaining minimum system information includes control resource set information sent by the base station via a physical down-link shared channel.

6. The method of claim 1, further comprising identifying boundaries of the synchronization signal block.

7. The method of claim 6, wherein identifying the boundaries of the synchronization signal block further includes identifying at least one of a starting resource block index, an ending resource block index, a starting slot index, or an ending slot index of the synchronization signal block.

8. The method of claim 6, wherein identifying the boundaries of the synchronization signal block further includes identifying at least one of a starting resource block index, the resource block length, a starting slot index, or the slot length of the synchronization signal block.

9. The method of claim 6, wherein identifying the boundaries of the synchronization signal block further includes reading a rate match bitmap.

10. The method of claim 1, further comprising:
receiving, from the base station within the cell, a third set of resources for a second synchronization signal block, wherein the second set of resources is rate matched around the third set of resources.

11. A user equipment, comprising:
a memory;
a transceiver; and
one or more processors, operatively coupled to the memory and the transceiver, configured to:
receive, via the transceiver from a base station within the cell, a first set of resources for a synchronization signal block;
receive, via the transceiver from the base station within the cell, a grant that indicates a second set of resources allocated for system information, wherein the second set of resources is associated with a down-link control channel and scheduling of a down-link shared channel;
determine that the second set of resources is rate matched around the first set of resources when the second set of resources overlaps the synchronization signal block;
extract initialization information from the system information; and
connect to the base station using the initialization information.

12. The user equipment of claim 11, wherein the second set of resources is rate matched around the first set of resources when at least a first resource block of the first set of resources overlaps in time with at least a second resource block of the second set of resources.

13. The user equipment of claim 11, wherein the one or more processors are further configured to receive broadcasted initialization information, wherein connecting to the base station using the initialization information further includes connecting to the base station using the broadcasted initialization information.

14. The user equipment of claim 11, wherein the system information includes remaining minimum system information.

15. The user equipment of claim 14, wherein the remaining minimum system information includes control resource set information sent by the base station via a physical down-link shared channel.

16. The user equipment of claim 11, wherein the one or more processors are further configured to identify boundaries of the synchronization signal block.

17. The user equipment of claim 16, wherein identifying the boundaries of the synchronization signal block further includes identifying at least one of a starting resource block index, an ending resource block index, a starting slot index, or an ending slot index of the synchronization signal block.

18. The user equipment of claim 16, wherein identifying the boundaries of the synchronization signal block further includes identifying at least one of a starting resource block index, the resource block length, a starting slot index, or the slot length of the synchronization signal block.

19. The user equipment of claim 16, wherein identifying the boundaries of the synchronization signal block further includes reading a rate match bitmap.

20. The user equipment of claim 11, wherein the one or more processors are further configured to:
receive, via the transceiver from the base station within the cell, a third set of resources for a second synchronization signal block, wherein the second set of resources is rate matched around the third set of resources..

21. A non-transitory computer-readable medium including instructions stored therein that, when executed by one or more processors, cause the one or more processors to:
receive, from a base station within the cell, a first set of resources for a synchronization signal block;
receive, from the base station within the cell, a grant that indicates a second source of resources allocated for system information, wherein the second set of resources is associated with a down-link control channel and scheduling of a down-link shared channel;
determine that the second set of resources is rate matched around the first set of resources when the second set of resources overlaps the synchronization signal block;
extract initialization information from the system information; and
connect to the base station using the initialization information.

22. The non-transitory computer-readable medium of claim 21, wherein the second set of resources is rate matched around the first set of resources when at least a first resource block of the first set of resources overlaps in time with at least a second resource block of the second set of resources.

23. The non-transitory computer-readable medium of claim 21, further includes instructions stored therein that, when executed by the one or more processors, cause the one or more processors to receive broadcasted initialization information, wherein connecting to the base station using the initialization information further includes connecting to the base station using the broadcasted initialization information.

24. The non-transitory computer-readable medium of claim 21, wherein the system information includes remaining minimum system information.

25. The non-transitory computer-readable medium of claim 24, wherein the remaining minimum system information message includes control resource set information sent by the base station via a physical down-link shared channel.

26. The non-transitory computer-readable medium of claim 21, further includes instructions stored therein that, when executed by the one or more processors, cause the one or more processors to identify boundaries of the synchronization signal block.

27. The non-transitory computer-readable medium of claim 26, wherein the instructions that identify the boundaries of the synchronization signal block further includes instructions that, when executed by the one or more processors, cause the one or more processors to identify at least one of a starting resource block index, an ending resource block index, a starting slot index, or an ending slot index of the synchronization signal block.

28. The non-transitory computer-readable medium of claim 26, wherein the instructions that identify the boundaries of the synchronization signal block further includes instructions that, when executed by the one or more processors, cause the one or more processors to identify at least one of a starting resource block index, the resource block length, a starting slot index, or the slot length of the synchronization signal block.

29. The non-transitory computer-readable medium of claim 26, wherein the instructions that identify the boundaries of the synchronization signal block further includes instructions that, when executed by the one or more processors, cause the one or more processors to read a rate match bitmap.

30. The non-transitory computer-readable medium of claim 21, further includes instructions stored therein that, when executed by the one or more processors, cause the one or more processors to:
receive, from the base station within the cell, a third set of resources for a second synchronization signal block, wherein the second set of resources is rate matched around the third set of resources.

* * * * *